United States Patent [19]

Murai

[11] Patent Number: 5,033,050

[45] Date of Patent: Jul. 16, 1991

[54] OPERATION CONTROL SYSTEM

[75] Inventor: Michio Murai, Tokyo, Japan

[73] Assignee: Kabushiki Kaisha Toshiba, Kanagawa, Japan

[21] Appl. No.: 325,794

[22] Filed: Mar. 20, 1989

[30] Foreign Application Priority Data

Mar. 28, 1988 [JP] Japan ................................. 63-73789

[51] Int. Cl.$^5$ ............................................. G06F 11/10
[52] U.S. Cl. ................................................ 371/49.1
[58] Field of Search ............................. 371/49.1, 49.2

[56] References Cited

U.S. PATENT DOCUMENTS

| | | | |
|---|---|---|---|
| 3,177,472 | 4/1965 | Githens | 371/49.1 |
| 4,223,326 | 9/1980 | D'Amato et al. | 371/49.1 |
| 4,224,681 | 9/1980 | Lewine | 371/49.1 |
| 4,326,291 | 4/1982 | Marsh et al. | 371/49.1 |
| 4,872,172 | 10/1989 | Sanner | 371/49.1 |

Primary Examiner—Jerry Smith
Assistant Examiner—Phung My Chung
Attorney, Agent, or Firm—Finnegan, Henderson, Farabow, Garrett and Dunner

[57] ABSTRACT

A data processing system having a device performing input and output of data for processing the data. The system includes a main control unit for processing the data and for performing a parity check function to detect abnormality of data transmitted in the system, a parity check control unit coupled to the main control unit for performing the parity check function for the device, and an external device unit operative coupled to the main control unit and the parity check control unit for performing input and output of the data under control of the parity check function and for generating an inhibition signal to inhibit the operation of the parity check control unit.

7 Claims, 4 Drawing Sheets

OPERATION CONTROL SYSTEM

BACKGROUND THE INVENTION

This invention relates to an operation control system, and more particularly to a system having a parity error detection function to detect abnormality of input-output data.

FIG. 1 shows a conventional data processing system 8, including a plurality of devices 10, 12, 14, and 18 interconnected by an external bus 16, for processing data subject to a parity error detection function As is well known in the art, a parity error detection function includes a parity generation operation by a device transmitting data, consisting of generating a parity bit from the data being transmitted, and a parity check operation by a device receiving data, consisting of generating a parity bit from the received data and comparing it to the parity bit generated by the device transmitting the data. In system 8, when input and output of data is performed by controlling a process input-output device 10 or external devices 12 and 14 through an external bus etc. by a main control device 18, the following parity check is performed. First of all, on data collection from main control device 18, device 18 sends a collection command through command signal line 20 directing process input-output device 10 or external device 12 or 14 to collect the data. In response, process input-output device 10 or external device 12 or 14, that received the collect command, sends the data to external bus 16, generates a parity bit in accordance with the prescribed function by a parity generating circuit 28, 30, or 32 of a respective interface 22 that is incorporated or connected thereto, and sends the party bit as a parity signal over a parity signal line 24. Thereupon, main control device 18 that has received collected data from external bus 16 and the parity signal of parity signal line 24 generates a parity bit by a parity detection circuit of a parity circuit 26, in accordance with the prescribed function from the collected data received. Main control device 18 then compares the generated parity bit with the received parity signal and makes a decision as to whether or not a parity error occurred on the transmission over bus 16.

On the other hand, during a data output operation from main control device 18, i.e. during a write parity check, main control device 18 sends an output command through command signal line 20 to process input-output device 10 or external device 12 or 14 that is trying to output data, then generates a parity bit by means of parity generating circuit 26 in accordance with the prescribed function from the output data, simultaneously with output of data through external bus 16, and sends this to parity signal line 24 as a parity signal. Thereupon, process input-output device 10 or external device 12 or 14 that has received the output command generates, by means of a parity detecting circuit of a respective interface 22 that is incorporated or connected thereto, a parity bit in accordance with the prescribed function from the received data, and performs a decision as to whether or not there is an abnormality by comparing it with the parity signal received from parity signal line 24.

In this way, conventionally, for process input-output device 10 connected to external bus 16, interface 22 is required having a parity circuit 28 consisting of parity generating and detecting circuit, which matches the parity check function in main control device 18. Similarly, in a conventional system external devices 12 and 14 require corresponding parity circuit 30 and 32 which match the parity check function in main control device 18.

As described above, in conventional systems interconnected via an external bus 16, main control device 18 having a specified parity check function requires corresponding purity circuits having identical parity check functions. Thus equipment having parity circuits using different parity check functions or equipment having no parity circuit can not be used on the same bus. Consequently, limitations are imposed on system architecture, and a flexible architecture can not be achieved.

SUMMARY OF THE INVENTION

It is an object of the invention to overcome some of the problems and disadvantages of, the prior art.

It is therefore desirable to provide a system and methods for parity check control in a data processing system.

The foregoing objects are achieved according to the present invention be providing a data processing system having a plurality of devices interconnected by an external bus for processing data subject to a parity error detection function. The system comprises main control device means coupled to the external bus for processing data, for transmitting and receiving data over the external bus, and for performing a parity check operation. The system also comprises parity check control device means coupled to the external bus and the main control device means and responsive to an inhibition signal for selectively performing a parity check function on data appearing on the external bus; and external device means coupled to the external bus, the main control device means, and the parity check control device means for transmitting and receiving data over the external bus, for performing input and output of data, and for selectively generating the inhibition signal according to predetermined criteria.

According to another aspect of the present invention, the above objects are achieved by providing a method for processing data subject to a parity error detection function in a data processing system having a plurality of devices interconnected by an external bus for processing data. The method comprises the steps of processing data in a main control device coupled to the external bus; selectively performing, in response to an inhibition signal, a parity check function in a parity check control device coupled to the external bus and the main control device on data appearing on the external bus; performing input and output of data transmitted and received over the external bus by an external means coupled to the external bus, the main control device means, and the parity check control device means; and selectively generating the inhibition signal in the external device according to predetermined criteria.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the present invention and many of its attendant advantages will be readily obtained by reference to the following detailed description considered in connection with the accompanying drawings, in which.

DESCRIPTION OF THE PREFERRED EMBODIMENTS

Figure 1:
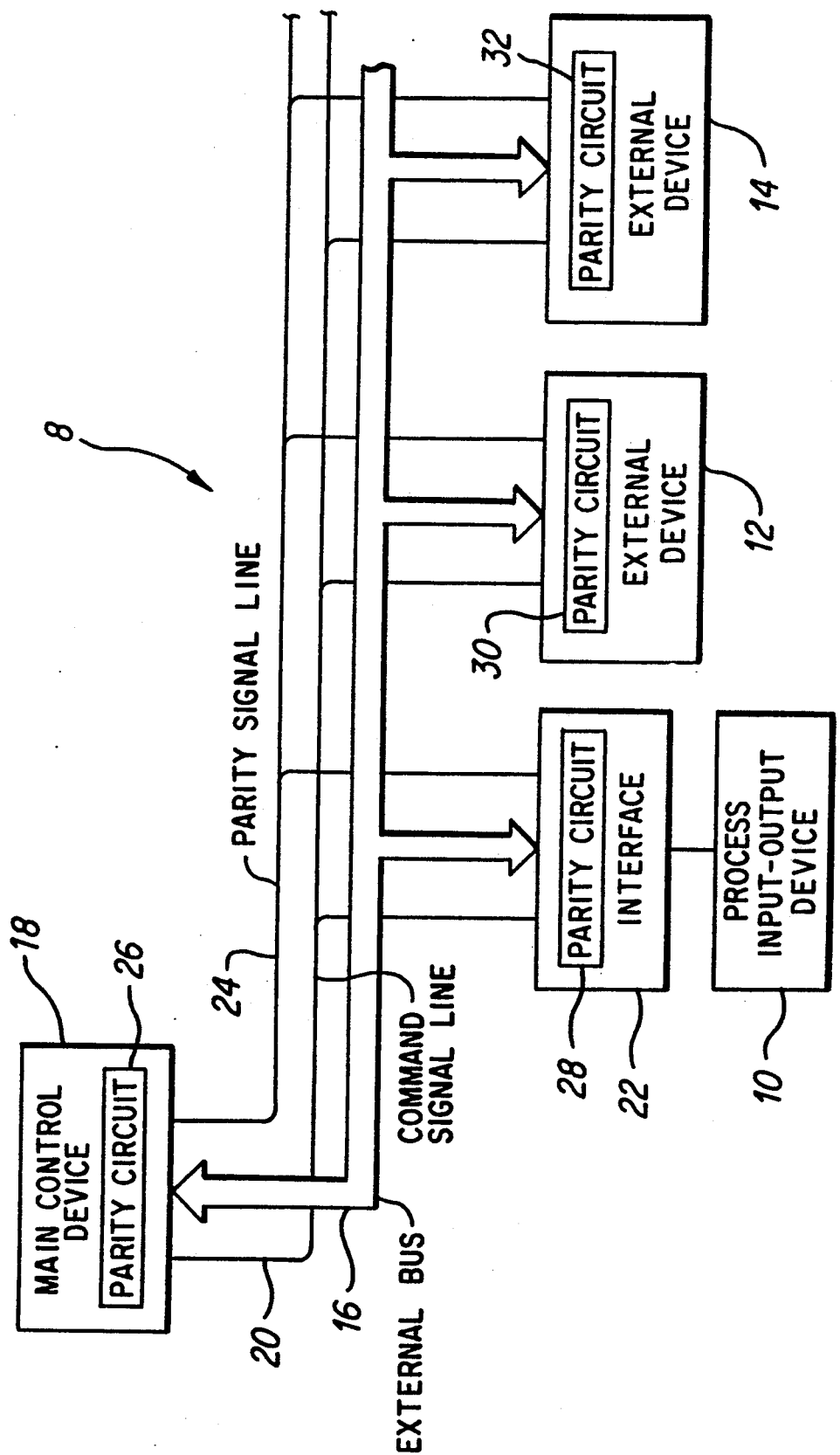
FIG. 1 is a diagram showing a conventional operation control system.
Figure 2:
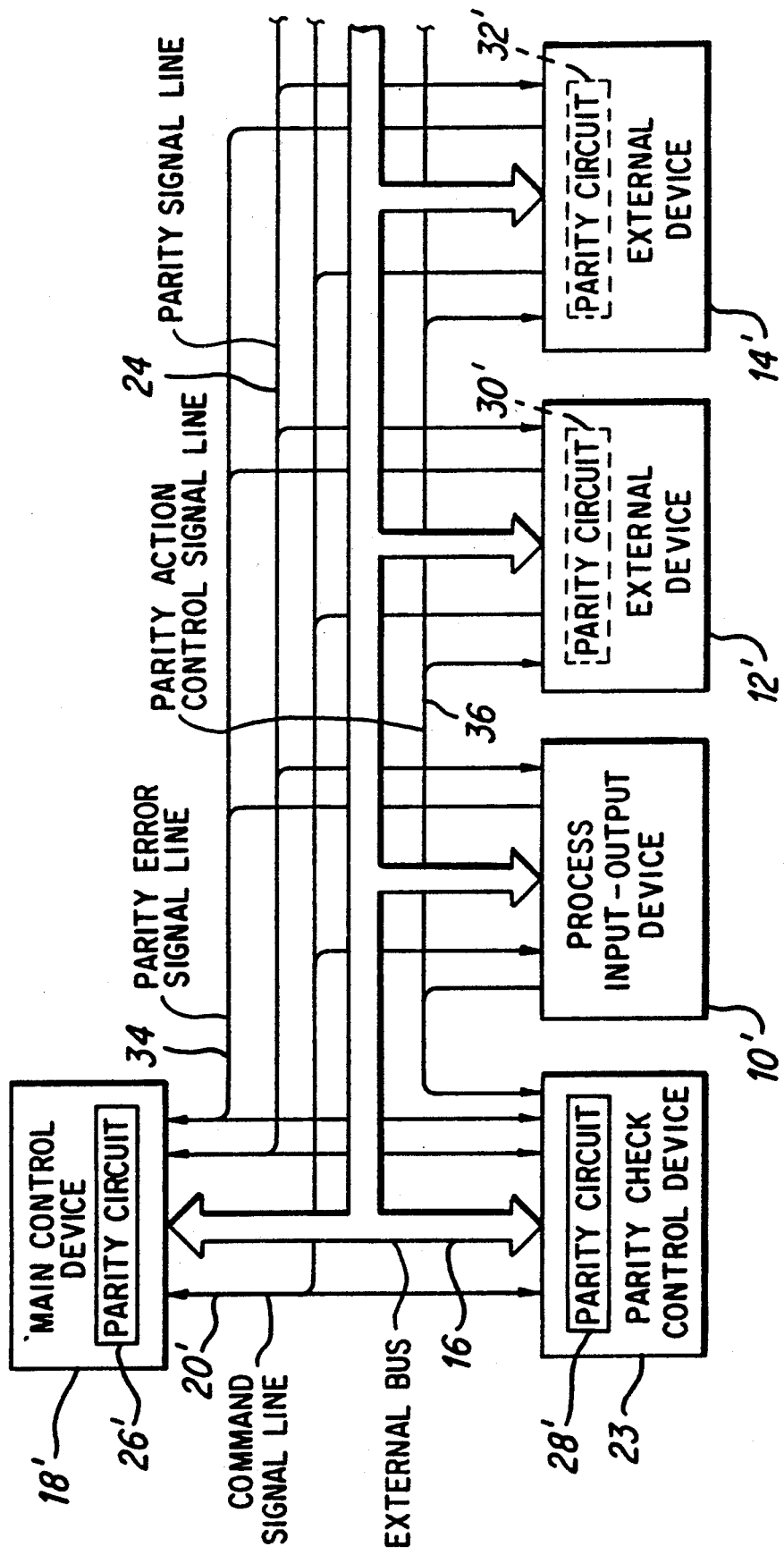
FIG. 2 is a diagram showing an operation control system according to a preferred embodiment of this invention.

Referring now to the drawings in which like reference characters refer to like elements, FIG. 2 shows an improved operation control system which includes a preferred embodiment of the invention.

Main control device 18' consists of conventional components including a central processing unit (CPU), a main memory (ROM, RAM), and an input-output interface part (I/O part), FIG. 2. Main control device 18' is coupled to an external bus 16 to connect to a process input-output device 10' and external devices 12', 14' such as, for example, intelligent terminals, for processing data, for transmitting and receiving data over the external bus, and for performing a parity check operation. A parity check control device 23 is coupled to external bus 16 and is coupled to main control device 18' via a command signal line 20, a parity signal line 24, and a parity error signal line 34. A parity action control signal line 36 is provided between parity check control device 23 and external device 12' and 14'. Parity check control device 23 is responsive to an inhibition signal on line 36 to selectively perform a parity check function on data appearing on external bus 16. External device 12' is coupled to external bus 16, main control device 18', and parity check control device 23 for transmitting and receiving data over the external bus, for performing input and output of data, and for selectively generating the inhibition signal according to predetermined criteria. It should be noted that process input-output device 10' is connectable with parity action signal line 36. However, for convenience in explanation, it is taken as not being connected.

Main control device 18', external devices 12' and 14', and parity check control device 23 respectively incorporate parity circuits 26', 30', 32', and 28' that detect abnormality of the respective input data.

Figure 3:
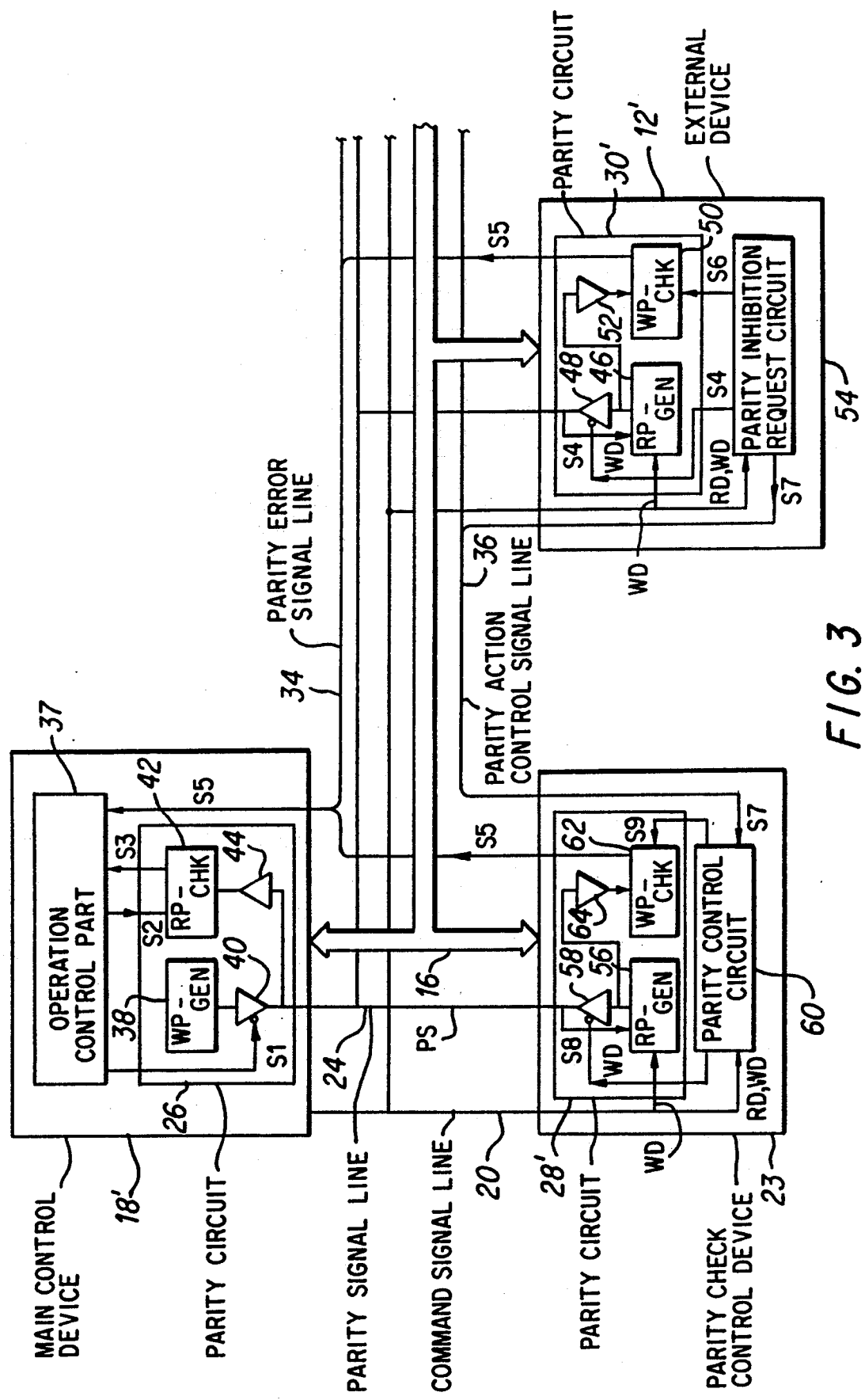
FIG. 3 is a diagram showing a parity circuits of the system of FIG. 2.

FIG. 3 shows a block diagram given in explanation of parity check function in main control device 18', external device 12' and parity check control device 23. It should be noted that external device 14' also has the same construction as external device 12'. Main control device 18' has a parity circuit 26 which includes a write parity generating circuit 38 and a gate circuit 40. Gate circuit 40, provided on the signal output side of a write parity generating circuit 38, opens in response to a write parity enable signal S1 from an operation control part 37. Operation control part 37 is connected to a read parity detecting circuit 42 that in case of abnormality returns a read parity error signal S3. A gate circuit 44 is provided on the signal input side of read parity detecting circuit 42.

External device 12' has a parity circuit 30' which includes a read parity generating circuit 46 and a gate circuit 48 provided on the signal output side of circuit 46. Gate circuit 48 opens in response to a parity operation inhibit signal S4 from a write parity inhibition request circuit 54. A write parity detection circuit 50 carries out a parity check and outputs a write parity error signal S5 onto parity error signal line 34 in case of abnormality. A gate circuit 52 is provided on the signal input side of the circuit 50.

It should be noted that parity circuit 30' performs a parity operation as determined by a ContrOl part not shown. When a parity operation is to be executed, parity operation inhibit signals S4 and S6 are output from parity inhibition request circuit 54 to gate 48 or write parity detection circuit 50. Parity inhibition request circuit 54 operates in response to collection command RD or output command WD from main control device 18', and outputs a parity operation inhibit request signal S7 to parity action control signal line 36 and inhibits output of parity operation inhibit signals S4, S6. Signal S7 thus constitutes an inhibition signal which is selectively generated according to predetermined criteria.

Parity circuit 28' in parity check control device 23 includes a read parity generating circuit 56 and a gate circuit 58 provided on the signal output side of circuit 56. Gate circuit 58 opens in response to output of a read parity enabling signal S8 from a parity control circuit 60. Parity control circuit 60 is connected to a write parity detection circuit 62 that carries out a parity check function in response to output of a write parity enabling signal S9 from parity control circuit 60 and that outputs write parity error signal S5 onto parity error signal line 34 in case of abnormality. A gate circuit 64 is provided on the signal input side of the circuit 62.

Parity control circuit 60 operates in response to collection command RD or output command WD from main control device 18'.

Parity control circuit 60 inhibits the operation of parity circuit 28' by inhibiting output read parity enabling signal S8 and write parity enabling signal S9, in response to input of parity operation inhibit request signal S7 from parity action control signal line 36.

Figure 4:
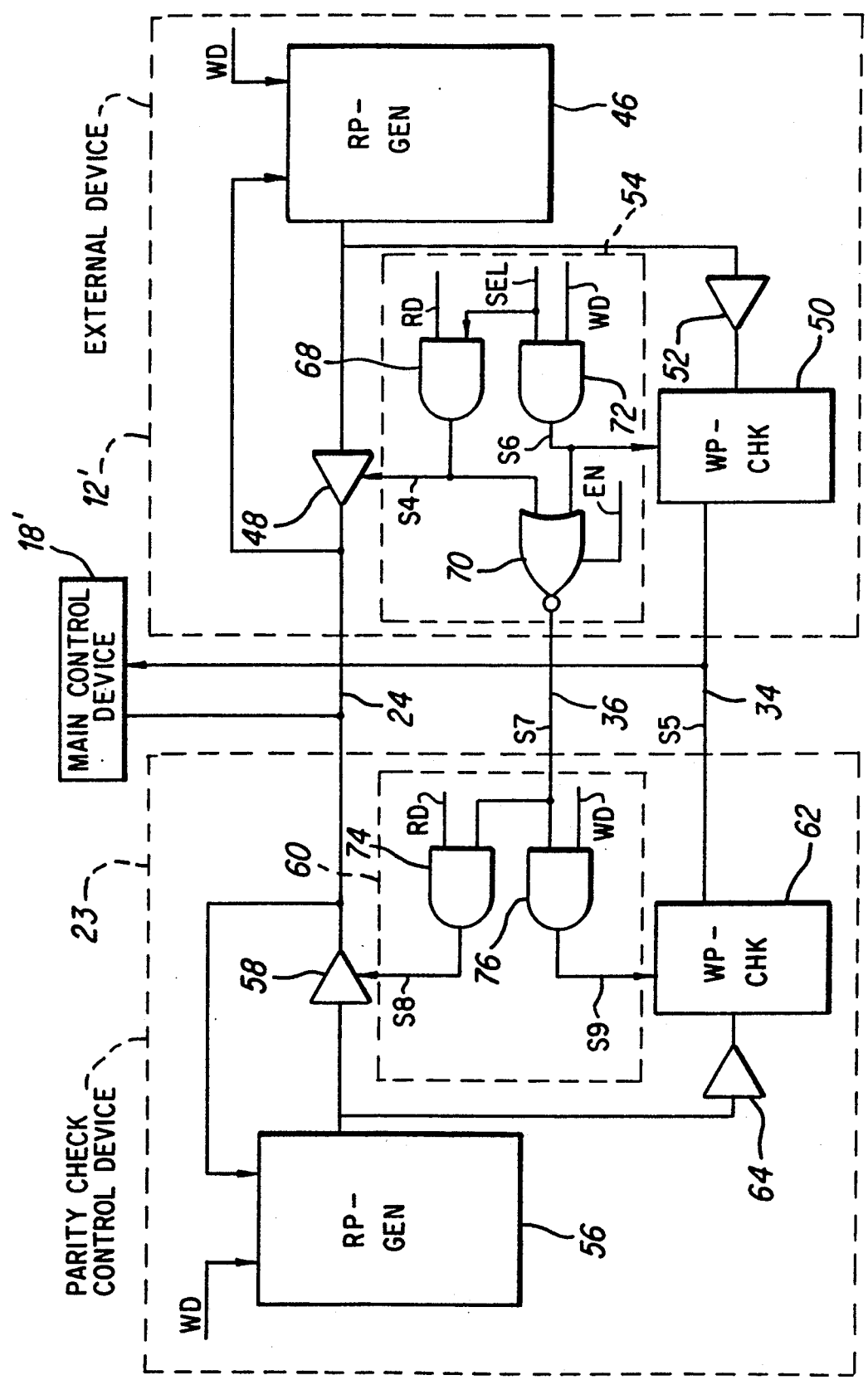
FIG. 4 is a detailed schematic diagram showing a parity inhibit request circuit and a parity control circuit of the system of FIGS. 2 and 3.

FIG. 4 is a circuit diagram showing external device 12' and parity check control circuit 23 in greater detail. In external device 12', a parity signal is input to read parity generating circuit 46 via line 24 in response to output command WD from main control device 18'. An AND gate 68 opens in response to collection command RD and a select signal SEL from main control device 18'. Select signal SEL activates external device 12' and is supplied through external bus 16. The output of AND gate 68 is supplied to a gate circuit 48 and a NOR gate 70. An AND gate 72 opens in response to output command WD and select signal SEL from main control device 18', and supplies parity operation inhibit signal S6 to write parity detection circuit 50 and NOR gate 70. NOR gate 70 operates in response to a parity control enabling signal EN supplied from a control part (not shown) when parity bit generation operation execution occurs, the output of gate 70 being connected to parity operation control signal line 36.

On the other hand, read parity generating circuit 56 operates in parity check control device 23, in response to output command WD, to supply a parity signal to gate 58. An AND gate 74 operates in response to collection command RD and signal S7, and supplies a control signal S8 to a gate circuit 58. An AND gate 76 opens in response to output command WD and signal S7 and supplies signal S9 to write parity detection circuit 62.

An operation will be first described in which data is collected by main control device 18' accessing external device 12'. When a collect command RD is transmitted to external device 12' from main control device 18', the collected data is sent as output data to external bus 16, and a parity bit is generated from the output data by read parity generating circuit 46 in accordance with the prescribed function. A parity bit is also generated by read parity generating circuit 56, in response to collect command RD, in accordance with the prescribed function, from the output data of this external device 12'.

Thereupon, according to predetermined criteria where, for example, the parity check function of external device 12' is different from the same function of main control device 18', or in the case where parity operation in external device 12' is inhibited temporarily or for a specified data region, gate circuit 48 of external device 12' is closed, so the parity bit generated by read parity generating circuit 46 is not output to parity signal line 24. On the other hand, signal S7 on parity action control signal line 36 is in inhibition state, and consequently read parity enable signal S8 is in permission state. As a result, the parity bit generated by read parity generating signal 56 of parity check control device 23 is output to parity signal line 24 as a parity signal.

In contrast to this, in the case where the parity check function of, for example, external device 12' is the same as the parity check function of main control device 18', gate circuit 48 is opened by parity operation inhibit signal S4. Also, parity operation inhibit request signal S7 is output to parity action control signal line 36 from parity inhibition request circuit 54, causing read parity enable signal S8 to assume an inhibition state. As a result, the parity bit generated by read parity generating circuit 56 of parity check control device 23 is not output, and the parity bit generated by read parity generating circuit 46 of this external device 12 is output to parity signal line 24 as parity signal.

In main control device 18', when collected data and parity signal are received from external device 12' or parity check control device 23, a parity bit is generated in accordance with the prescribed function from the received data by read parity detection circuit 42 (FIG. 3), and compared with the parity signal received over parity signal line 24 synchronously with read parity check signal S2, and a decision is made as to whether or not there is an abnormality. If a decision is made that there is an abnormality, read parity error signal S3 is sent to operation control part 37. That is, in main control device 18', a parity check can be carried out by the same operation irrespective of whether a parity signal generated from external device 12' is in question, or a parity signal generated from parity check control device 23 is in question.

Next, the case will be described where main control device 18' performs data output by accessing external device 12'. Output command WD is transmitted to external device 12' from main control device 18', and data is output from device 18' through external bus 16. At the same time as this, a party bit is generated in accordance with the prescribed function from the output data by means of write parity generating circuit 38 (FIG. 3), and this parity bit is transmitted to parity signal line 24 as a parity signal synchronously with write parity enable signal S1. Thereupon, both of external device 12' and parity check control device 23 input the output data and parity signal. When parity circuit 30' of external device 12' does not perform parity operation, signal S7 on parity action control signal line 36 is not output, so write parity enable signal S9 is output to write parity detecting circuit 62 from parity control circuit 60 in parity check control device 23. As a result, in write parity detecting circuit 62, a parity bit is generated in accordance with the prescribed function from received output data, compared with the received parity signal, and an abnormality decision is made. If abnormality is judged to have occurred, write parity error signal S5 is sent to parity error signal line 34.

In contrast, when parity circuit 30' of external device 12' does perform a parity operation, parity operation inhibit request signal S7 is output to parity action control signal line 36 from parity inhibit request circuit 54, causing write parity enable signal S9 not to be output. As a result, the parity check operation is not performed in write parity detection circuit 62 of parity check control device 23, and, in write parity generating circuit 50 of external device 12', a parity bit is generated in accordance with the prescribed function from the received output data, compared with the received parity signal, and a decision regarding abnormality is made. In the case of abnormality, write parity error signal S5 is sent to parity error signal line 34.

On the other hand, in the case where main control device 18' accesses input/output device 10' and performs data collection or output, signal S7 on parity action control signal line 36 supplied to parity control circuit 60 in parity check control device 23 is never present, so a parity check on the output data and generation of a parity bit for the collected data are always performed by parity circuit 28' of this parity check control device 23.

Thus, with this embodiment, when parity inhibit request signal S7 is not input, parity check control device 23 can execute parity check with main control device 18' in place of input/output device 10 or external devices 12' or 14', and data input/output is possible between main control device 18' and input/output device 10 or external devices 12' or 14'. Consequently, due to the connection of this parity check control device 23 on external bus 16 of main control device 18' having a parity check function, an input/output device that does not have a parity check function, or external devices 12', 14' that have parity circuits 30', 32' of different parity check function can be connected on the same bus 16. As a result, restrictions on system architecture are relaxed, and a flexible system architecture can be achieved, thereby improving practicability.

Also, in the case where the parity check function in external devices 12' and 14' is the same as the parity check function of main control device 18', parity request inhibit signal S7 is sent to parity check control device 23 from parity inhibition request circuit 54, causing the parity check operation of parity check control device 23 to be inhibited. Consequently, a system architecture can also be achieved that makes use of the parity check function of external devices 12' and 14', thereby improving practicability.

It will be apparent to those skilled in the art that various modifications and variations can be made in the apparatus and methods of this invention without departing from the spirit or scope of the present invention. The present invention covers such modifications and variations which are within the scope of the appended claims and their equivalents.

What is claimed is:

1. A data processing system having a plurality of devices, interconnected by an external bus, for processing data subject to a parity error detection function, comprising:

main control device means, coupled to the external bus, for processing data, for transmitting and receiving data over the external bus, and for performing a parity check operation;

parity check control device means coupled to the external bus and the main control device means, and responsive to an inhibition signal for selectively performing a parity check function on data appearing on the external bus; and external device means coupled to the external bus, the main control device means, and the parity check control device means for transmitting and receiving data over the external bus, for performing input and output of data, and for selectively generating the inhibition signal according to predetermined criteria.

2. The system of claim 1 wherein the main control means includes means for generating output and collection commands; and wherein the parity check control device means includes means responsive to the output command and the inhibition signal for selectively performing a parity check operation and means responsive to the collection command and the inhibition signal for selectively performing a parity generation operation.

3. The system of claim 1 wherein the parity check control means includes parity check means for performing a parity check operation, and parity control means for inhibiting the operation of the parity check control means in response to the inhibition signal.

4. The system of claim 1 wherein the external device means includes parity check means for performing a parity check operation, and parity inhibition means for generating the inhibition signal.

5. The system of claim 1 wherein the main control means and the external device each include means for performing a parity error detection function, and wherein the external device means generates the inhibition signal when the main control device means and the external device means have different parity error detection functions.

6. The system of claim 1 wherein the external device means comprises inhibitable means for performing a parity error detection function, and wherein the external device means generates the inhibition signal when the means for performing a parity error detection function is inhibited.

7. A method for processing data subject to a parity error detection function in a data processing system having a plurality of devices interconnected by an external bus for processing data, comprising:

processing data in a main control device coupled to the external bus;

selectively performing, in response to an inhibition signal, a parity check function in a parity check control device coupled to the external bus and the main control device on data appearing on the external bus;

performing input and output of data transmitted and received over the external bus by an external means coupled to the external bus, the main control device means, and the parity check control device means; and selectively generating the inhibition signal in the external device according to predetermined criteria.

* * * * *